US010823232B2

(12) United States Patent
Dell

(10) Patent No.: US 10,823,232 B2
(45) Date of Patent: Nov. 3, 2020

(54) ISOLATION DEVICE

(71) Applicant: Litens Automotive Partnership, Woodbridge (CA)

(72) Inventor: James W. Dell, Newmarket (CA)

(73) Assignee: Litens Automotive Partnership, Woodbridge (CA)

( * ) Notice: Subject to any disclaimer, the term of this patent is extended or adjusted under 35 U.S.C. 154(b) by 356 days.

(21) Appl. No.: 15/578,826

(22) PCT Filed: Jun. 3, 2016

(86) PCT No.: PCT/CA2016/050641
§ 371 (c)(1),
(2) Date: Dec. 1, 2017

(87) PCT Pub. No.: WO2016/191888
PCT Pub. Date: Dec. 8, 2016

(65) Prior Publication Data
US 2018/0163788 A1    Jun. 14, 2018

Related U.S. Application Data

(60) Provisional application No. 62/170,149, filed on Jun. 3, 2015, provisional application No. 62/281,200, filed
(Continued)

(51) Int. Cl.
*F16D 3/12* (2006.01)
*F02B 67/06* (2006.01)
(Continued)

(52) U.S. Cl.
CPC ............... *F16D 3/12* (2013.01); *F02B 67/06* (2013.01); *F16D 41/206* (2013.01);
(Continued)

(58) Field of Classification Search
CPC ...... F16H 55/36; F16H 2055/366; F16H 7/20; F16D 7/02; F16D 7/022; F16D 41/20;
(Continued)

(56) References Cited

U.S. PATENT DOCUMENTS 3,653,228 A    4/1972  Tiberio
4,351,167 A *  9/1982  Hanke ..................... F16D 3/66
                                                      192/205
(Continued)

FOREIGN PATENT DOCUMENTS

CA       2753767 A1    9/2010
CN     103210226 A     7/2013
(Continued)

OTHER PUBLICATIONS

DE102009039989(A1) Translation; Fechler et al; Belt Pulley for Diverting Mechanical Energy of Internal Combustion Engine in Motor Vehicle; Published: Apr. 15, 2010; Espacenet; (Year: 2010).*
(Continued)

*Primary Examiner* — Michael R Mansen
*Assistant Examiner* — Raveen J Dias
(74) *Attorney, Agent, or Firm* — Millman IP Inc.

(57) ABSTRACT

In an aspect an isolation device is provided, comprising a hub that is connectable to a shaft; a pulley that is rotatable relative to the hub; at least one isolation spring positioned to transfer torque between the hub and the pulley, wherein each of the at least one isolation spring is an arcuate helical compression spring having an isolation spring axis that is arcuate; and a spring shell that is monolithic and that receives the at least one isolation spring and transfers torque between the at least one isolation spring and the pulley. The spring shell surrounds more than 180 degrees of the at least one isolation spring in a plane that is perpendicular to the isolation spring axis.

11 Claims, 18 Drawing Sheets

Related U.S. Application Data on Jan. 21, 2016, provisional application No. 62/296,742, filed on Feb. 18, 2016, provisional application No. 62/339,083, filed on May 19, 2016.

(51) Int. Cl.
| | |
|---|---|
| *F16D 41/20* | (2006.01) |
| *F16F 15/123* | (2006.01) |
| *F16F 15/14* | (2006.01) |
| *F16F 15/16* | (2006.01) |
| *F16H 55/36* | (2006.01) |

(52) U.S. Cl.
CPC ........ *F16F 15/123* (2013.01); *F16F 15/1442* (2013.01); *F16F 15/16* (2013.01); *F16H 55/36* (2013.01); *F16H 2055/366* (2013.01)

(58) Field of Classification Search
CPC .......... F16D 41/206; F16D 43/24; F16D 3/66; F16D 13/08; F16D 13/12; F16D 3/10; F16D 3/14; F16F 15/16; F16F 15/123; F16F 15/12366; F16F 15/12333; F16F 15/12353; F16F 15/1442; E02B 64/04; E02B 67/06

See application file for complete search history.

(56) References Cited

U.S. PATENT DOCUMENTS

| | | | | |
|---|---|---|---|---|
| 4,690,256 A | * | 9/1987 | Bopp | F16F 15/161 192/3.21 |
| 4,739,866 A | * | 4/1988 | Reik | F16F 15/131 192/103 R |
| 5,152,189 A | * | 10/1992 | Miura | F16F 9/145 464/180 |
| 5,295,910 A | * | 3/1994 | Friedmann | F16F 15/13415 464/63.1 |
| 5,511,446 A | * | 4/1996 | Kajitani | F16F 15/13484 192/30 V |
| 5,536,208 A | * | 7/1996 | Krumm | F16F 15/13484 464/24 |
| 5,720,370 A | * | 2/1998 | Takahashi | F16F 9/145 188/306 |
| 10,060,502 B2 | * | 8/2018 | Boyes | F16F 15/12333 |
| 2007/0037644 A1 | | 2/2007 | Mevissen et al. | |
| 2011/0263365 A1 | | 10/2011 | Mende et al. | |
| 2011/0315502 A1 | | 12/2011 | Antchak et al. | |
| 2013/0098733 A1 | | 4/2013 | Antchak et al. | |
| 2013/0319814 A1 | * | 12/2013 | Antchak | F16D 7/022 192/41 S |
| 2014/0209428 A1 | | 7/2014 | Dell | |
| 2015/0075943 A1 | * | 3/2015 | Williams | F16D 13/76 192/41 S |
| 2015/0316138 A1 | * | 11/2015 | Dell | B60K 25/02 474/91 |
| 2016/0123453 A1 | * | 5/2016 | Starodoubov | B60K 25/02 474/94 |
| 2016/0138699 A1 | * | 5/2016 | Dell | B60K 25/02 474/94 |
| 2016/0146328 A1 | * | 5/2016 | Dell | F16H 55/36 474/94 |
| 2016/0265643 A1 | * | 9/2016 | Dell | F16H 55/36 |
| 2017/0023093 A1 | * | 1/2017 | Lebas | F16F 15/12373 |
| 2018/0051792 A1 | * | 2/2018 | Cariccia | F16H 55/36 |
| 2018/0087584 A1 | * | 3/2018 | Al-Kattan | F16D 3/66 |

FOREIGN PATENT DOCUMENTS

| | | |
|---|---|---|
| CN | 104520601 A | 4/2015 |
| DE | 10056661 A1 | 5/2002 |
| DE | 10057822 A1 | 6/2002 |
| DE | 102009039989 A1 | 5/2008 |
| GB | 2022776 A | 12/1979 |
| WO | 2008058499 A2 | 5/2008 |
| WO | 2009031569 A1 | 12/2009 |
| WO | 2013033825 A1 | 3/2013 |
| WO | 2013155615 A1 | 10/2013 |

OTHER PUBLICATIONS

EESR for EP16802308 dated Nov. 20, 2018.
Office Action for CN201680031842 dated Feb. 11, 2019.
Office Action for CN201680031842 dated Sep. 20, 2019.
English Translation for DE10056661A1.
English Translation for DE10057822A1.

* cited by examiner

ISOLATION DEVICE

CROSS-REFERENCE TO RELATED APPLICATIONS

This application claims the benefit of U.S. Provisional Application No. 62/170,149, filed on Jun. 3, 2015, U.S. Provisional Application No. 62/281,200, filed on Jan. 21, 2016, U.S. Provisional Application No. 62/296,742, filed on Feb. 18, 2016, and U.S. Provisional Application No. 62/339,083, filed on May 19, 2016, the contents of all of which are incorporated herein by reference in their entirety.

FIELD

This disclosure relates to isolation devices for endless drive members and, in particular, to a decoupler that is mounted on a crankshaft pulley on a vehicular engine.

BACKGROUND OF THE DISCLOSURE

It is common for vehicle engines to drive a plurality of accessories using an accessory drive system that includes a belt. Isolation devices have been used for some time to inhibit torsional vibrations from the crankshaft from being transmitted or from being transmitted at full amplitude to the accessories through the belt.

In the automotive industry, there is generally significant pressure to reduce the cost of components, and to reduce their complexity. Accordingly, it would be advantageous to provide an isolation device that was less expensive and that required fewer elements than other analogous devices. Furthermore there is generally a continuing need for improvements in general with isolation devices.

SUMMARY OF THE DISCLOSURE

In an aspect an isolation device is provided for engagement between a shaft of a rotating member and an endless drive member. The isolation device include a hub that is mountable to the shaft of the rotating member, a pulley that is configured to engage the endless drive member, at least one isolation spring that transfers torque between the hub and the pulley and a damping member that cooperates with the pulley to define a fluid chamber having an outlet. The damping member has at least one damping member projection and the pulley has at least one pulley projection thereon. The at least one damping member cooperates with the pulley projection to at least in part determine a size of a flow restriction to fluid flow from the fluid chamber, and determine a size of the fluid chamber. Movement of the pulley and hub relative to one another in at least one direction causes movement of the at least one damping member projection and the at least one pulley projection towards each other so as to reduce the size of the flow restriction, and also reduces the size of the fluid chamber so as to cause fluid to flow through the flow restriction and out of the fluid chamber.

In another aspect an isolation device is provided for engagement between a shaft of a rotating member and an endless drive member, comprising a hub that is mountable to the shaft of the rotating member; at least one isolation spring; and a pulley comprising a main pulley portion and a pulley cover. The pulley and the hub are configured to be rotatable relative to one another. The pulley cover fixedly engages the outer circumferential wall and covers the pulley channel. The pulley cover has a first spring end engagement surface thereon for engagement with a first end of the at least one isolation spring and a second spring end engagement surface thereon for engagement with a second end of the at least one isolation spring. The at least one isolation spring transfers torque from one of the hub and the pulley to the other of the hub and the pulley through the first end engagement surface, and from the other of the hub and the pulley to said one of the hub and the pulley through the second end engagement surface.

In another aspect an isolation device is provided for engagement between a shaft of a rotating member and an endless drive member, comprising a hub that is mountable to the shaft of the rotating member; a pulley that is configured to engage the endless drive member; at least one isolation spring that transfers torque between the hub and the pulley; a first seal proximate a distal end of the hub, between the hub and the pulley; and a second seal proximate a proximal end of the hub, between the hub and the pulley.

In another aspect an isolation device is provided, comprising a hub that is connectable to a shaft; a pulley that is rotatable relative to the hub; at least one isolation spring positioned to transfer torque between the hub and the pulley, wherein each of the at least one isolation spring is an arcuate helical compression spring having an isolation spring axis that is arcuate; and a spring shell that is monolithic and that receives the at least one isolation spring and transfers torque between the at least one isolation spring and the pulley. The spring shell surrounds more than 180 degrees of the at least one isolation spring in a plane that is perpendicular to the isolation spring axis.

In another aspect a spring shell is provided that is monolithic and is shaped for holding at least one arcuate helical compression spring having an arcuate axis. The spring shell surrounds more than 180 degrees of the at least one isolation spring in a plane that is perpendicular to the arcuate axis.

In another aspect a decoupler is provided, comprising a hub configured to mount to a shaft; a pulley configured to engage an endless drive member; an isolation spring and a wrap spring clutch positioned to transmit torque in series between the hub and the pulley, wherein a first helical end of the wrap spring clutch is radially separated from subsequent coils of the wrap spring clutch; a carrier that is positioned to transfer torque between the isolation spring and the wrap spring clutch, and that has an isolation spring force transfer surface positioned to engage an end of the isolation spring. The carrier includes a carrier body that is polymeric and that contains a clutch end slot in which the first helical clutch end is positioned; a metallic force spreader that is positioned in abutment with a tip on the helical end of the wrap spring clutch and that is also in abutment with a force transmission wall on the carrier body, a clutch retainer having a clutch retainer body that overlies the first helical end of the wrap spring clutch to prevent removal of the first helical end from the clutch end slot, and a plurality of legs that extend through a plurality of corresponding apertures in the carrier body and are bent to lock the clutch retainer to the carrier body.

In another aspect an isolation device is provided for engagement between a shaft of a rotating member and an endless drive member, comprising: a hub that is mountable to the shaft of the rotating member; a pulley that is configured to engage the endless drive member; at least one isolation spring that transfers torque between the hub and the pulley; and a bushing that rotatably supports the pulley on the hub.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
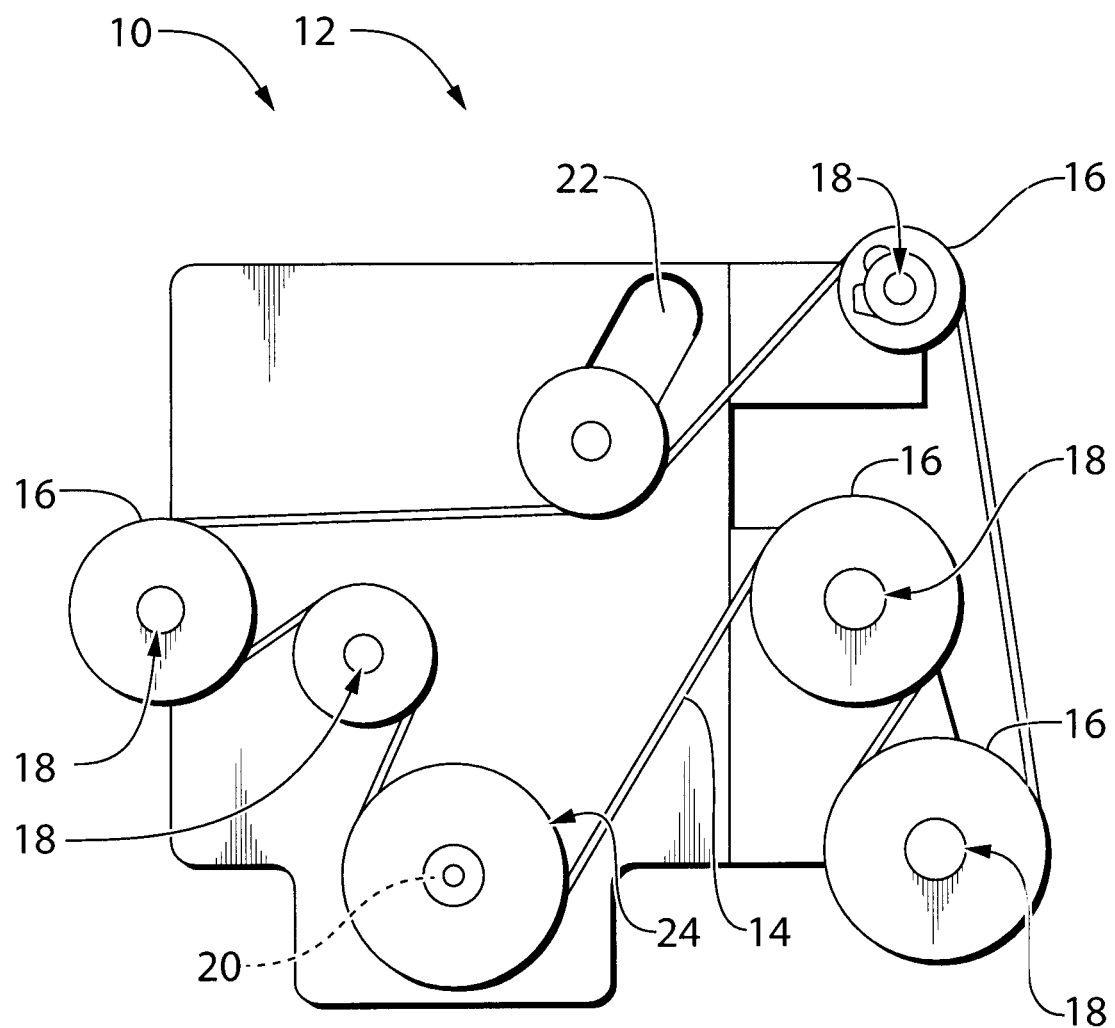
FIG. 1 is a side view of an engine having an isolation device, according to a non-limiting embodiment of the present disclosure.

Reference is made to FIG. 1, which shows an endless drive arrangement 10 for an engine 12. The endless drive arrangement 10 provides an endless drive member 14 that is used to transfer power between the engine 12 and one or more accessories. The endless drive member 14 may be a belt or any other suitable endless drive member. Furthermore, the endless drive member 14 may be referred to herein as a belt 14 for readability, but it will be understood that it may be any suitable endless drive member. The accessories may include, for example, one or more of an alternator (or Motor-Generator Unit in some hybrid vehicles), a water pump, an air conditioning compressor. Each accessory includes a pulley 16 mounted to an accessory shaft 18. The engine 12 has a crankshaft 20. A tensioner 22 is used to maintain tension on the belt 14.

An isolation device 24 is provided in the endless drive arrangement 10 to reduce the transmission of torsional vibrations through the belt 14 to the components engaged by the belt 14.

Figure 2A:
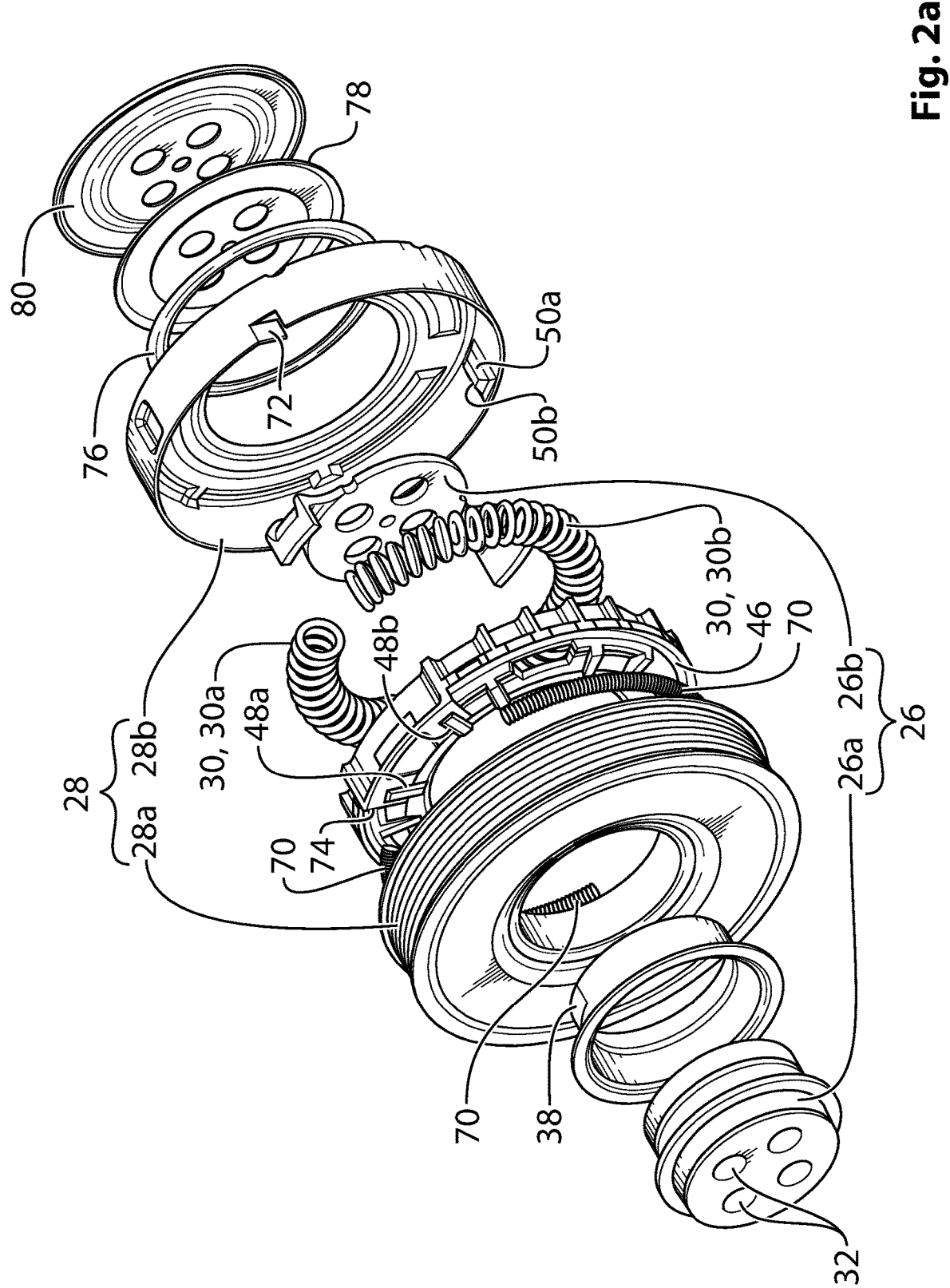
FIG. 2a is an exploded perspective view of the isolation device shown in FIG. 1.
Figure 2B:
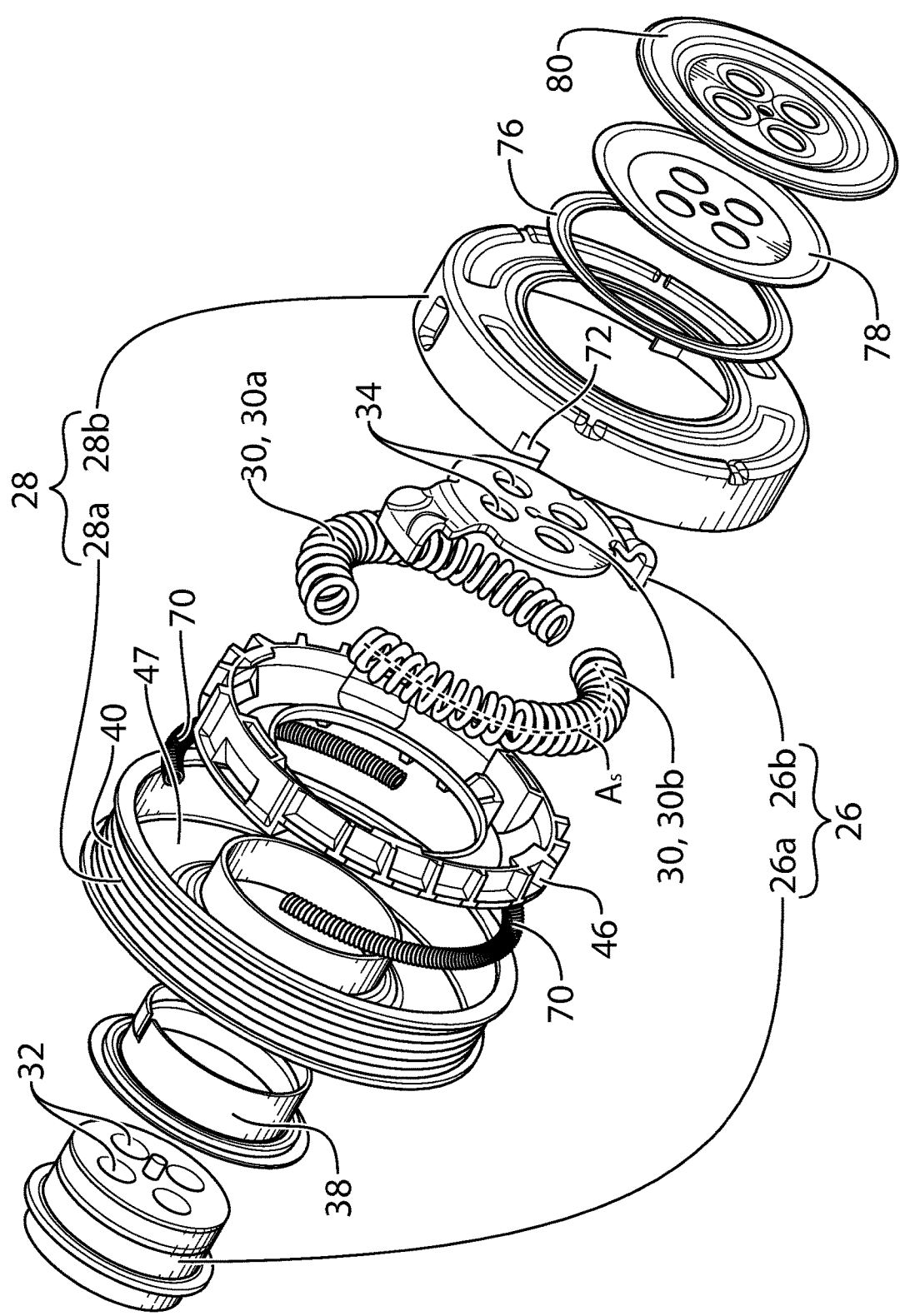
FIG. 2b is another exploded perspective view of the isolation device shown in FIG. 1.
Figure 3A:
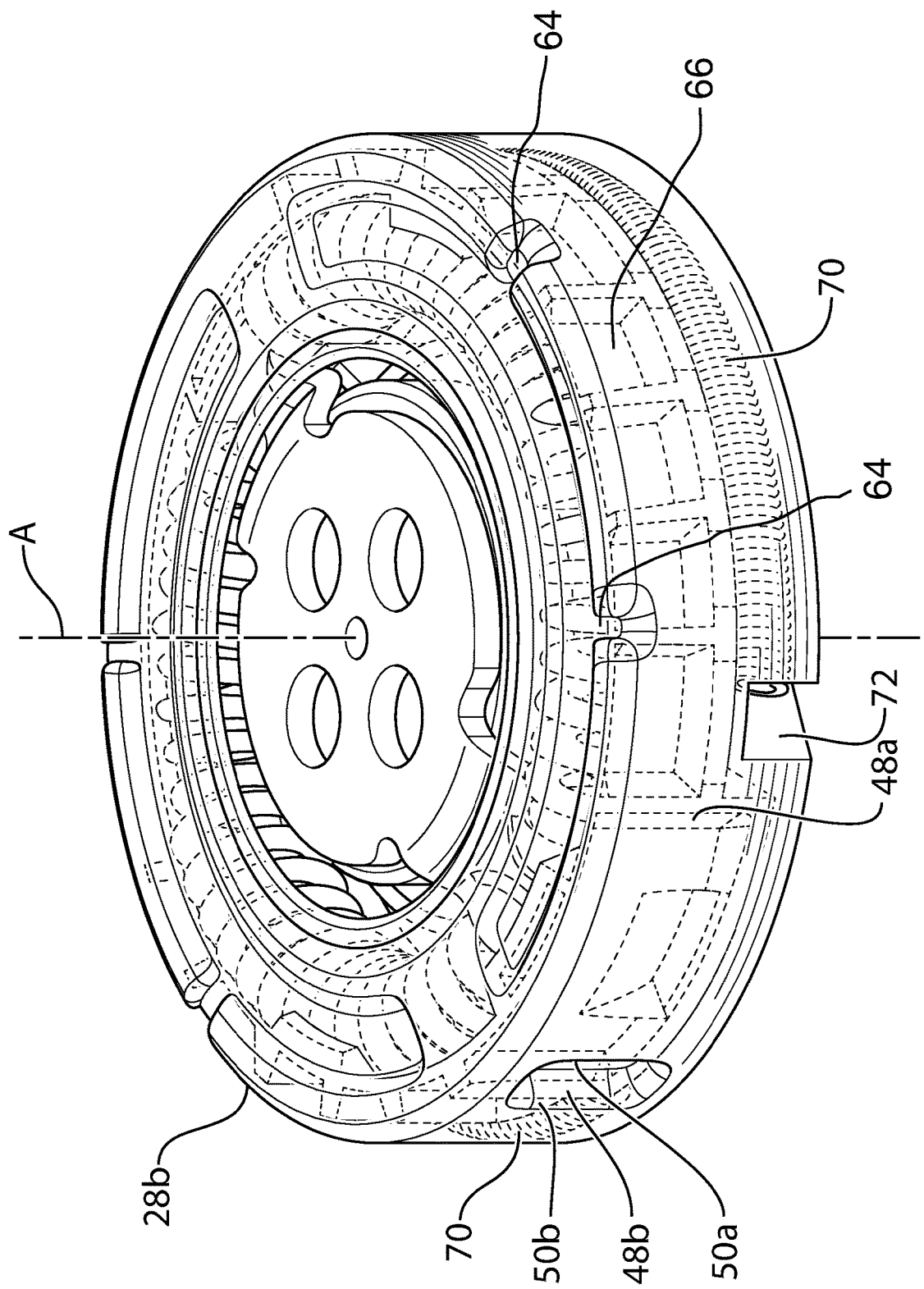
FIG. 3a is a perspective view of a portion of the isolation device shown in FIG. 1 in a first position.
Figure 3B:
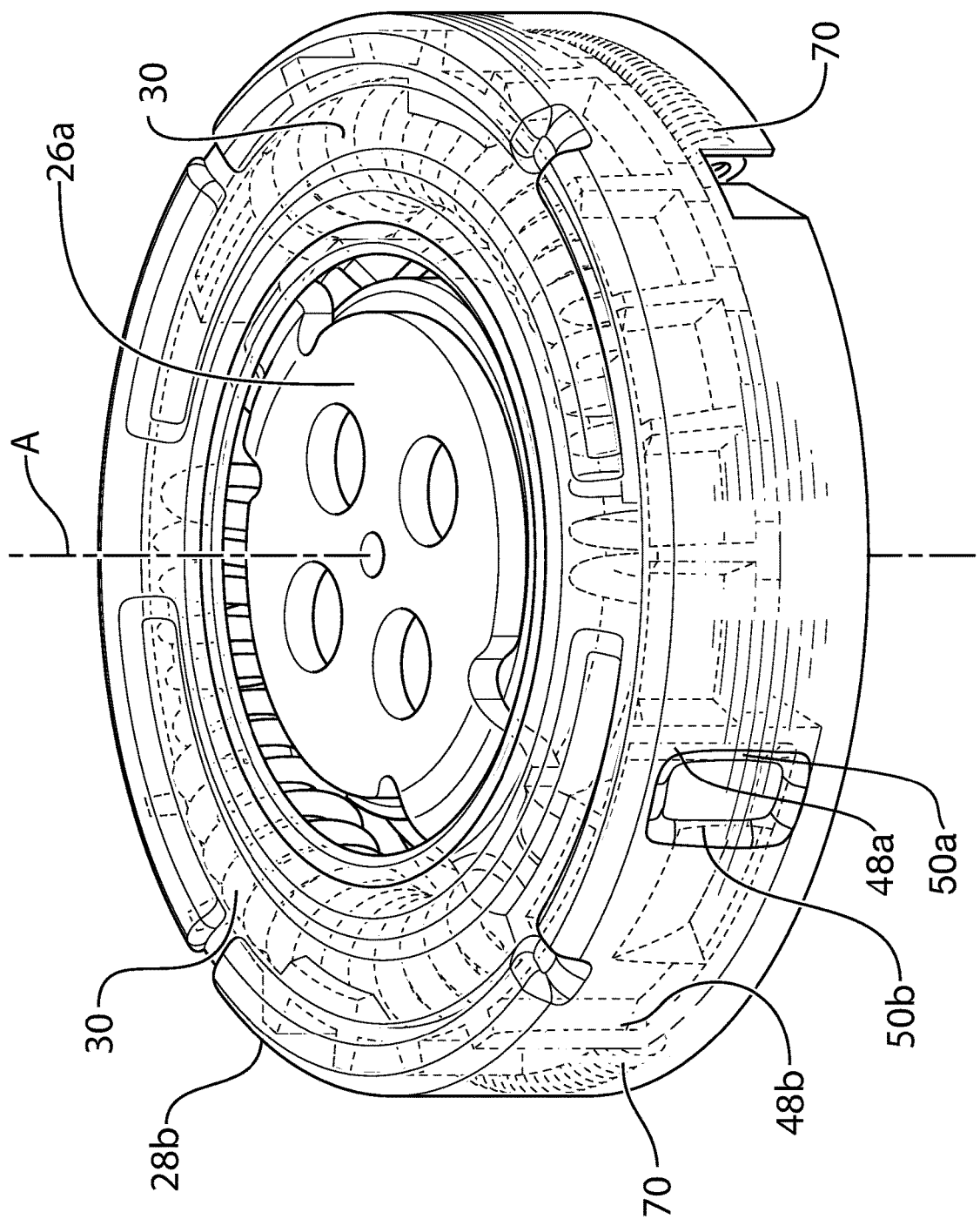
FIG. 3b is a perspective view of the portion of the isolation device shown in FIG. 3a in a second position.

The isolation device 24 is shown in more detail in the exploded views shown in FIGS. 2a and 2b. The isolation device 24 includes a hub 26, a pulley 28, at least one isolation spring 30 that is used to transfer torque between the hub 26 and pulley 28.

The hub 26 includes a shaft adapter 26a and a driver 26b. The shaft adapter 26a is fixedly mountable in any suitable way to a rotating member (e.g. a device shaft, such as the engine crankshaft 20), for rotation about an isolation device axis A. For example, the crankshaft 20 may include a plurality of threaded apertures that mate with mounting apertures shown at 32 on the shaft adapter 26a, and mounting apertures 34 on the driver 26b. Threaded fasteners 36 (FIG. 1) may be used to pass through the apertures 32 and 34 and into the apertures on the crankshaft 20 to fixedly mount the driver 26b and the shaft adapter 26a to the crankshaft 20. Alternatively, any other mounting structure may be used to mount the hub 26 to the crankshaft 20. The driver 26b and the shaft adaptor 26a may be made from any suitable materials such as a suitable steel.

The pulley 28 is engageable with the belt 14 (FIG. 1) and is rotatably mounted to the hub 26 e.g. by means of a bearing member 38 that directly supports the pulley 28 on the shaft adapter 26a, so that the pulley 28 is rotatable relative to the hub 26. The pulley 28 may be made up of a first pulley portion 28a (which may be a main pulley portion that has the belt engagement surface 40 configured for engagement with the belt 14), and a second pulley portion 28b (which may be a pulley cover that is press fit or otherwise fixedly connected to the first pulley portion 28a). In the example shown in FIGS. 2a and 2b, the first pulley portion 28a may be metallic and may be formed from a process involving several steps including machining, the second pulley portion 28b may be formed from sheet metal and thus may have its features formed using a stamping process or the like.

The at least one isolation spring 30 transfers torque between the hub 26 and the pulley 28. The at least one isolation spring 30 elastically deforms to isolate the belt 14 and the crankshaft 20 from vibrations or other sudden changes in torque in one another. In the embodiment shown in FIGS. 2a and 2b, the at least one isolation spring 30 includes first and second isolation springs 30a and 30b, which are arcuate, helical compression springs. However, any other suitable type of springs could be used, such as, for example, arcuate closed cell foam springs. As shown in FIG. 2b, each spring 30 has a spring axis As, which is arcuate.

The bearing member 38 may be any suitable type of bearing member, such as, for example, a bushing made from Nylon impregnated with PTFE (Teflon™) or the like.

Figure 4:
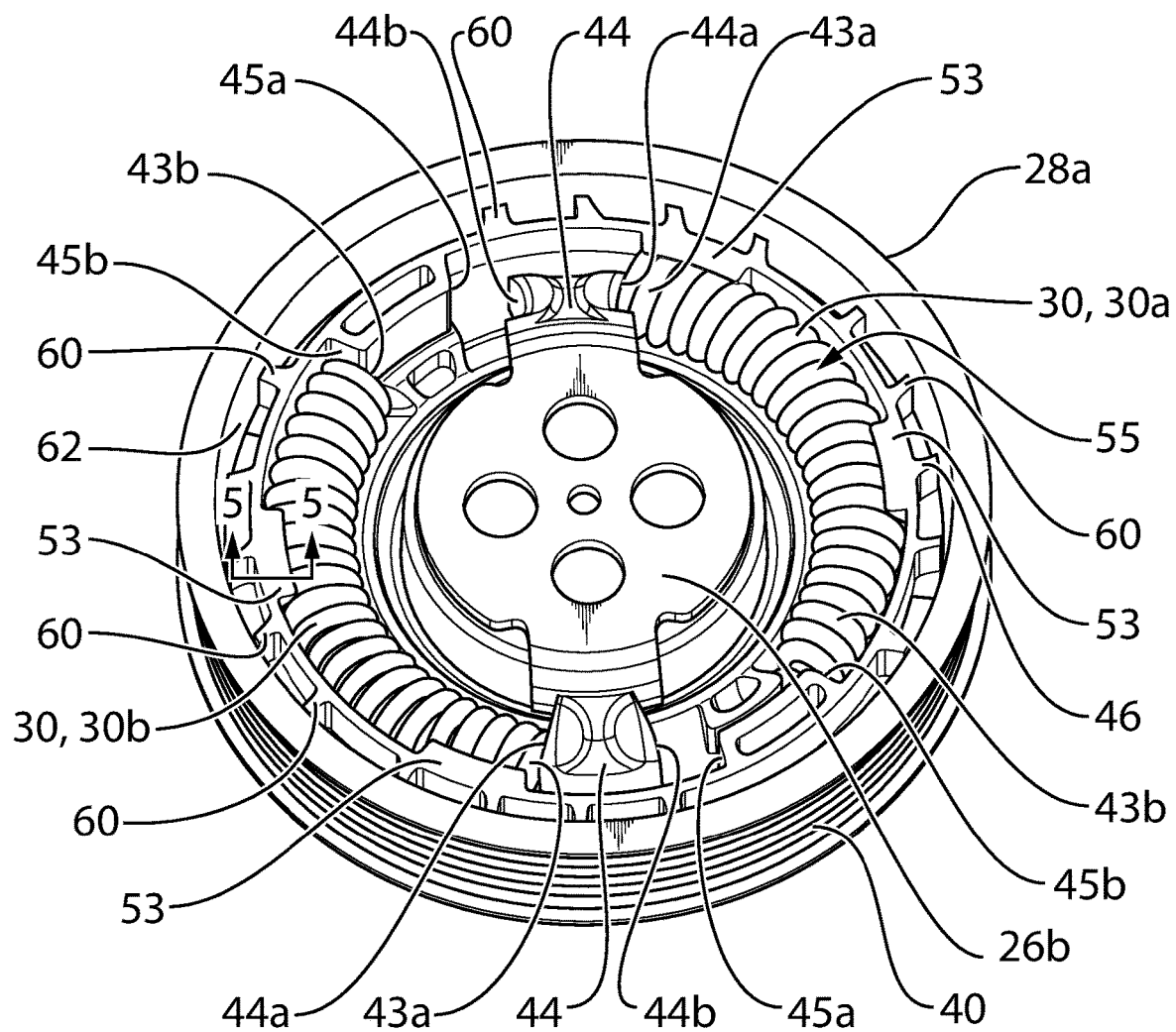
FIG. 4 is a perspective view of the portion of the isolation device shown in FIG. 3a with a component removed to better show parts obscured thereby.

The isolation springs each have a first end 43a and a second end 43b. The driver 26b has first and second arms 44, each with first and second spring drive surfaces 44a and 44b which are engageable with the first or second ends 43a and 43b respectively of the springs 30. Spring end engagement surfaces 45a or 45b that are ultimately connected to the pulley 28 (optionally through a lost motion connection as shown herein) are also engageable with the first or second ends 43a and 43b respectively of the springs 30. When the driver 26a and the pulley 28 rotate one way relative to one another, the drive surfaces 44a engage the spring ends 43a and the surfaces 45b engage the spring ends 43b (FIG. 4). When the driver 26a and the pulley 28 rotate the opposite way relative to one another, the drive surfaces 45a engage the spring ends 43a and the surfaces 44b engage the spring ends 43b. As a result, the springs 30 transfer torque between the hub 26 and the pulley 28.

The surfaces 45a and 45b are optionally provided on a spring shell 46 that houses the isolation springs 30. The spring shell 46 may be positioned in a chamber 47 (FIG. 2b) in the pulley 28. The spring shell 46 has first and second pulley engagement surfaces 48a and 48b, which are engageable with first and second travel limit surfaces 50a and 50b on the pulley 28 via a lost motion connection. In the example shown, the travel limit surfaces 50a and 50b are on the pulley cover 28b, and are thus relatively easily formed therein by means of a stamping operation.

Figure 6:
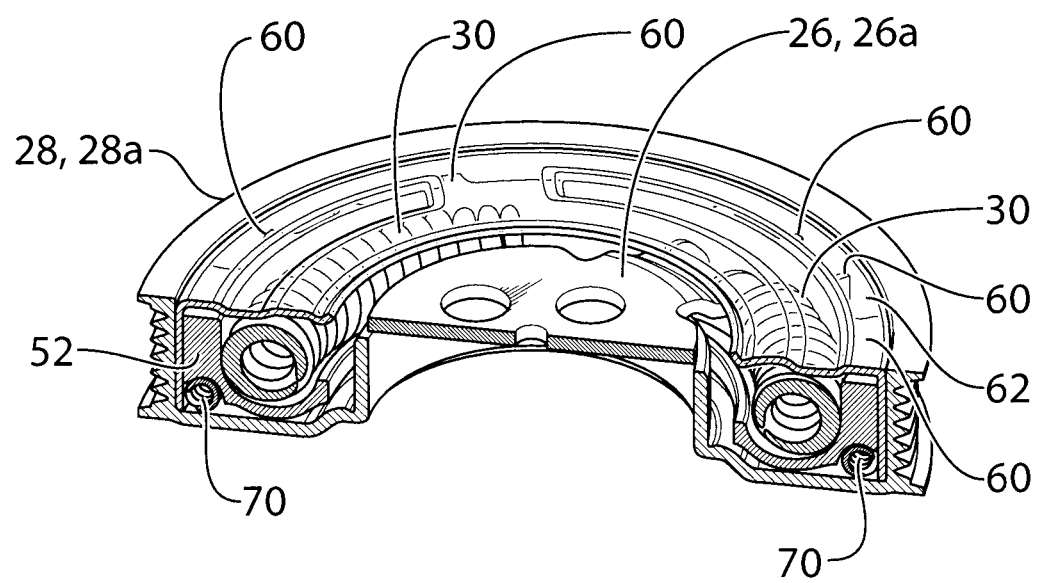
FIG. 6 is a sectional perspective view of the isolation device shown in FIG. 1.

It will be noted that the travel limiters 50a and 50b are provided relatively far out radially from the isolation device axis A. For example the travel limiters 50a and 50b may be provided on the radially inner surface 52 of the outer wall of the pulley 28. In the present example, the outer wall of the pulley 28 is the wall formed by both the first and second pulley portions 28a and 28b together when they are press fit together, as shown in FIG. 6. By providing the travel limiters 50a and 50b on the radially inner surface 52 of the radially outer wall of the pulley 28, they provide relatively high moments for a given dimensional size of isolation device, and therefore they operate using relatively low forces, thereby reducing stresses on the engaged surfaces 48a and 50a or 48b and 50b as the case may be. There may be provided two sets of surfaces 48a and 48b.

The spring shell 46 receives the at least one isolation spring 30 and transfers torque between the at least one isolation spring 30 and the pulley 28 (via the engagement of surfaces 48a and 50a or 48b and 50b). The spring shell 46 may be monolithic but yet may surround an angle TH (FIG. 5) that is more than 180 degrees of the at least one isolation spring 30 in a plane that is perpendicular to the isolation spring axis As (e.g. in a radial-axial plane relative to a spring shell axis, which is the isolation device axis A), in at least one location and optionally in a plurality of locations about the circumference of the spring shell 46. As can be seen, in the example shown in FIG. 4, there are four tabs 53 (two per spring 30), that provide enclosure of the springs 30 beyond the 180 enclosure angle that is present for the remaining portions of the spring shell 46. In the region of these tabs 53 an aperture 54 is provided on an axially opposing side of the spring shell 46. In other words, the spring shell 46 has a generally U-shaped channel 55 (which serves as a chamber for the isolation springs 30) and which has tabs 53 at one or more selected points along the channel 55. The channel 55 has a covered angle of not more than 180 degrees in the regions of the channel 55 away from the tabs 53 and opens towards a first side 56 of the spring shell 46. The tabs 53 are provided on this first side 56 to extend the covered angle TH to more than 180 degrees.

Figure 5:
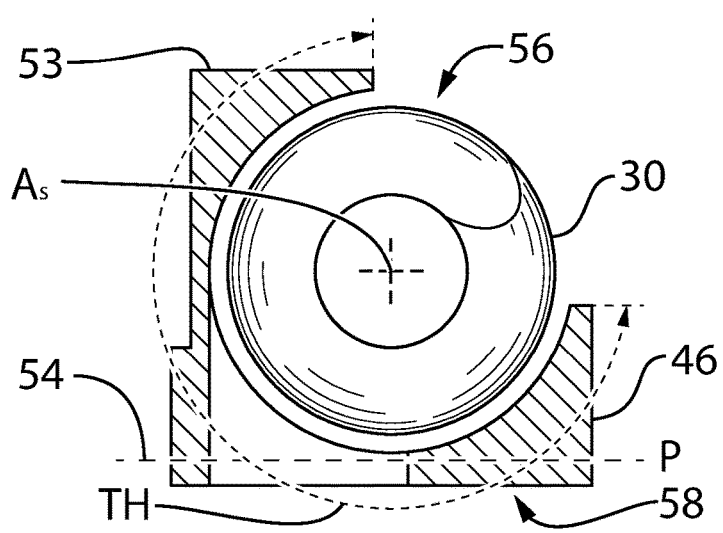
FIG. 5 is a sectional view along section line 5-5 in FIG. 4.

The apertures 54 extend axially through the spring shell 46 from the opposing second side (shown at 58) of the spring shell 46 to the tabs 53 and overlap the entirety of the tabs 53 in a radial plane (shown at P in FIG. 5). This permits the spring shell 46 to be injection molded without the use of slides, simply with the use of two mold plates.

As shown in FIG. 4, and in FIG. 6, the spring shell 46, which is movable relative to the pulley 28 has a plurality of vanes 60 that extend generally in axial-radial planes about the perimeter of the spring shell 46. The pulley 28 (the pulley cover 28a specifically) has a plurality of pulley projections 64 thereon, which extend axially. The spring shell 46 and the pulley 28 together define a fluid chamber 66 via the vanes 60 and pulley projections 64. As the spring shell 46 and the pulley 28 move relative to one another, the vanes 60 sweep through a volume of lubricant shown in FIGS. 4 and 6 at 62. The space between the mutually facing surfaces of the spring shell 46 and the pulley 28 acts as an outlet for the fluid chamber 66. As the spring shell 46 and the pulley 28 move relative to one another, the positions of the vanes 60 and the pulley projections 64 change relative to one another, which at least in part determines the effective size of the outlet from the fluid chamber 66. Thus it may be said that the spring shell 46 cooperates with the pulley projections 64 to at least partially determine the a size of the flow restriction to fluid flow from the fluid chamber 66.

More specifically, movement of the pulley 28 and the hub 26 relative to one another in at least one direction causes movement of the vanes 60 and the at least one pulley projections 64 towards each other so as to reduce the size of the flow restriction, and also reduces the size of the fluid chamber so as to cause fluid to flow through the flow restriction and out of the fluid chamber 66.

In the present embodiment, the spring shell 46 may be considered to be a damping member and the vanes 60 may be referred to as damping member projections. The movement between the spring shell 46 and the pulley 28 is permitted by virtue of the lost motion connection described above.

The vanes 60 may extend directly radially outward from the periphery of the spring shell 46, or alternatively the vanes 60 may be angled non-radially. By angling the vanes 60 in one non-radial direction or the other, asymmetric damping can be provided to movement of the spring shell 46 relative to the pulley 28. As a result, during certain transient conditions that cause the pulley 28 and spring shell 46 to rotate in one direction relative to one another, the damping will be relatively stronger, while certain other transient conditions that cause the pulley 28 and the spring shell 46 to rotate in one direction relative to one another, the damping will be relatively weaker.

Embodiments of the isolation device 24 described herein may have one or more of the following features:

increase or decrease the amount of viscous damping generated in any direction by increasing or decreasing the gap width (hence, the shear rate) betwixt the vanes 60 and the inner surface of the pulley 28;

increase or decrease the amount of viscous damping generated in any direction, by increasing or decreasing the vane width;

increase or decrease the amount of viscous damping generated in any direction, by increasing or decreasing the vane angle;

increase or decrease the amount of viscous damping generated in any direction, by increasing or decreasing the number of vanes 60;

control the amount and degree of asymmetrical damping by configuring the number of vanes 60 arranged in each rotational direction.

Transfer springs shown at 70 may be provided to cushion the impact between the surfaces 48a and 50a or 48b and 50b during movement of the spring shell 46 and the pulley 28 relative to one another in at least one rotational direction. The transfer springs 70 may be helical compression springs that have first ends that engage bent tabs 72 on the pulley cover 28b and second ends that engage engagement surfaces 74 on the spring shell 46.

As shown in FIGS. 2a and 2b, a seal 76, a thrust member 78 and a dust shield 80 may be provided to protect the isolation device from dust and debris. The fasteners 30 shown in FIG. 1 may pass through apertures in the thrust member 78 and the dust shield 80 to mount them fixedly.

Figure 7:
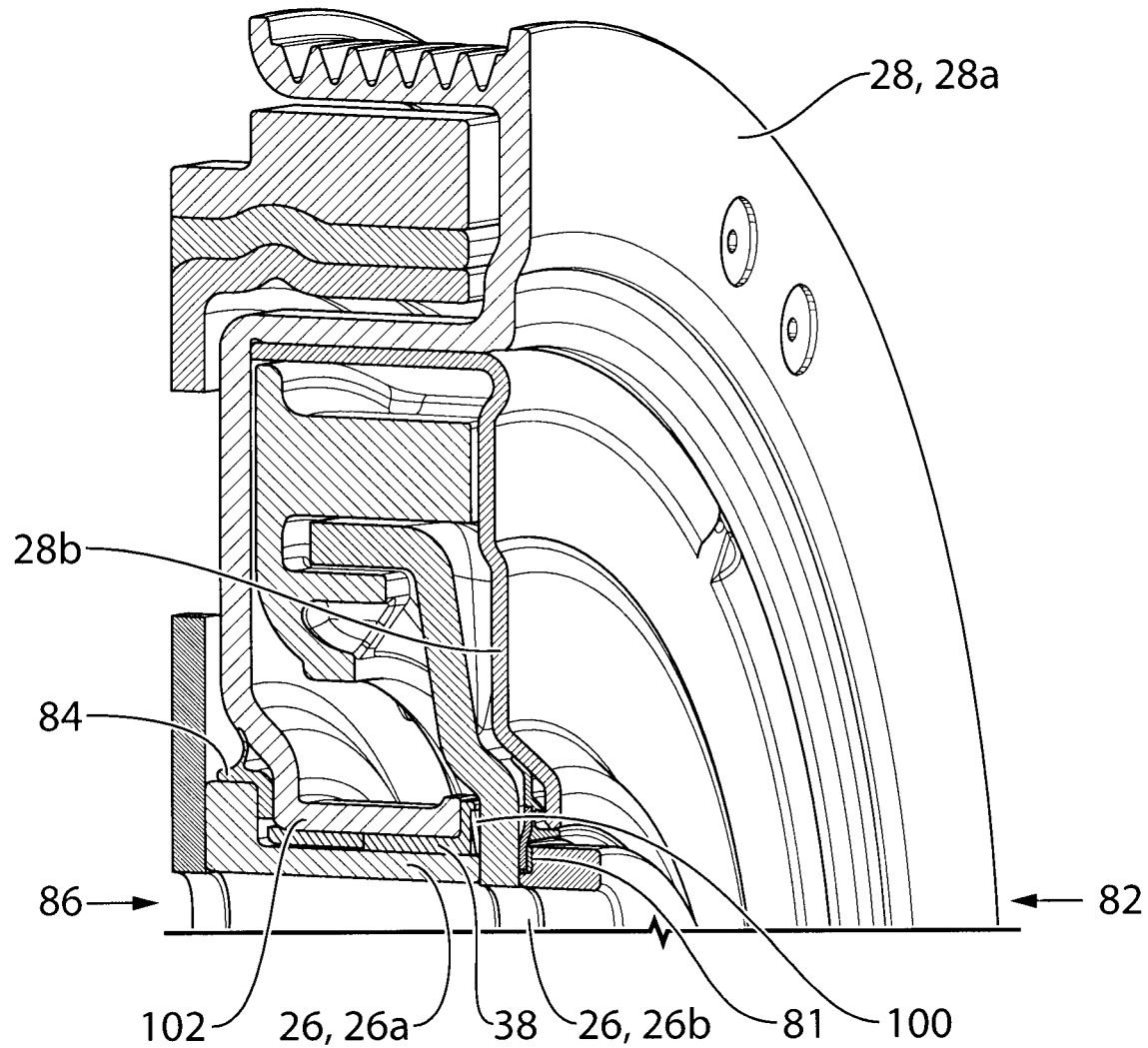
FIG. 7 is a sectional perspective view illustrating another aspect of the isolation device shown in FIG. 1.
Figure 8:
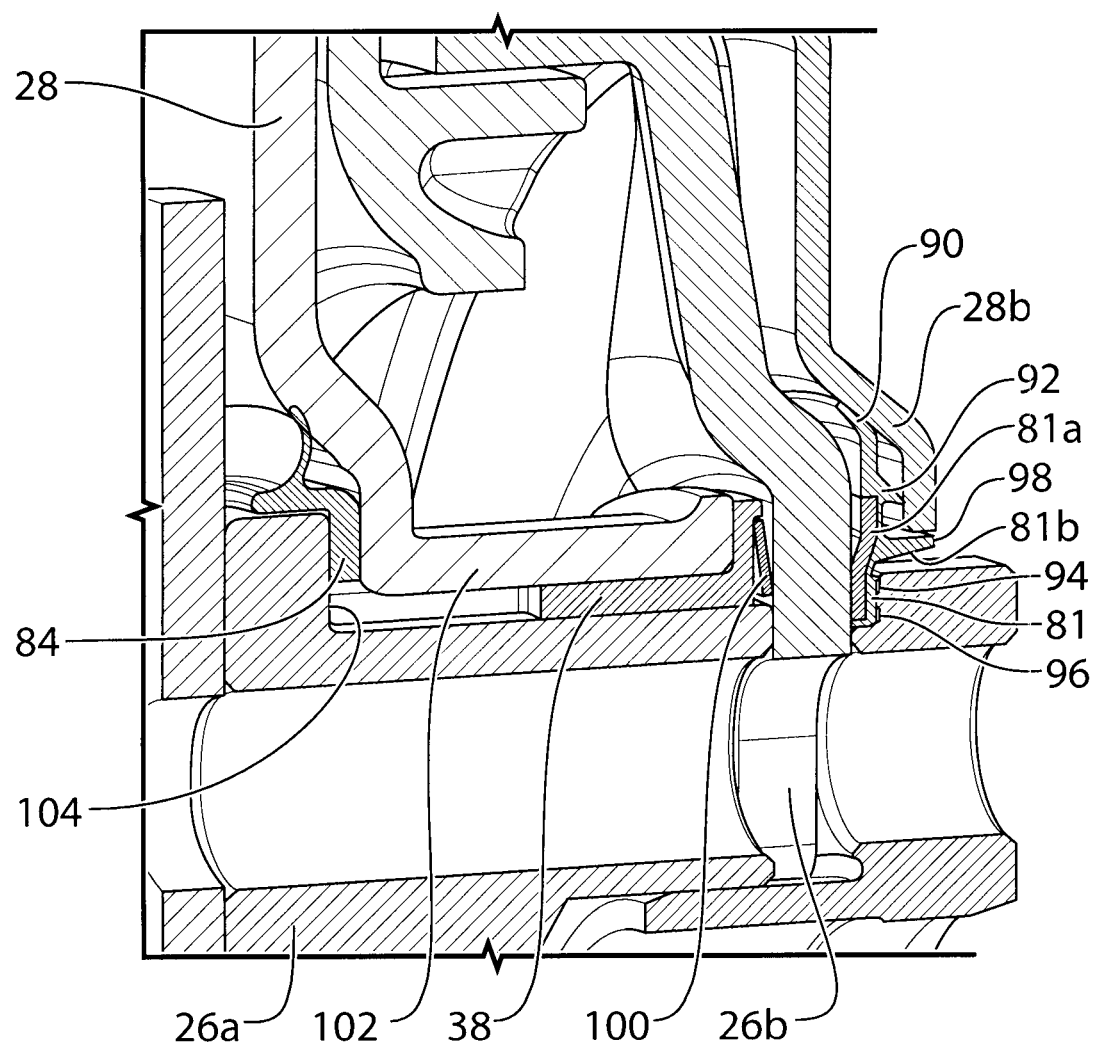
FIG. 8 is a magnified view of the portion of the isolation device shown in FIG. 7.
Figure 9:
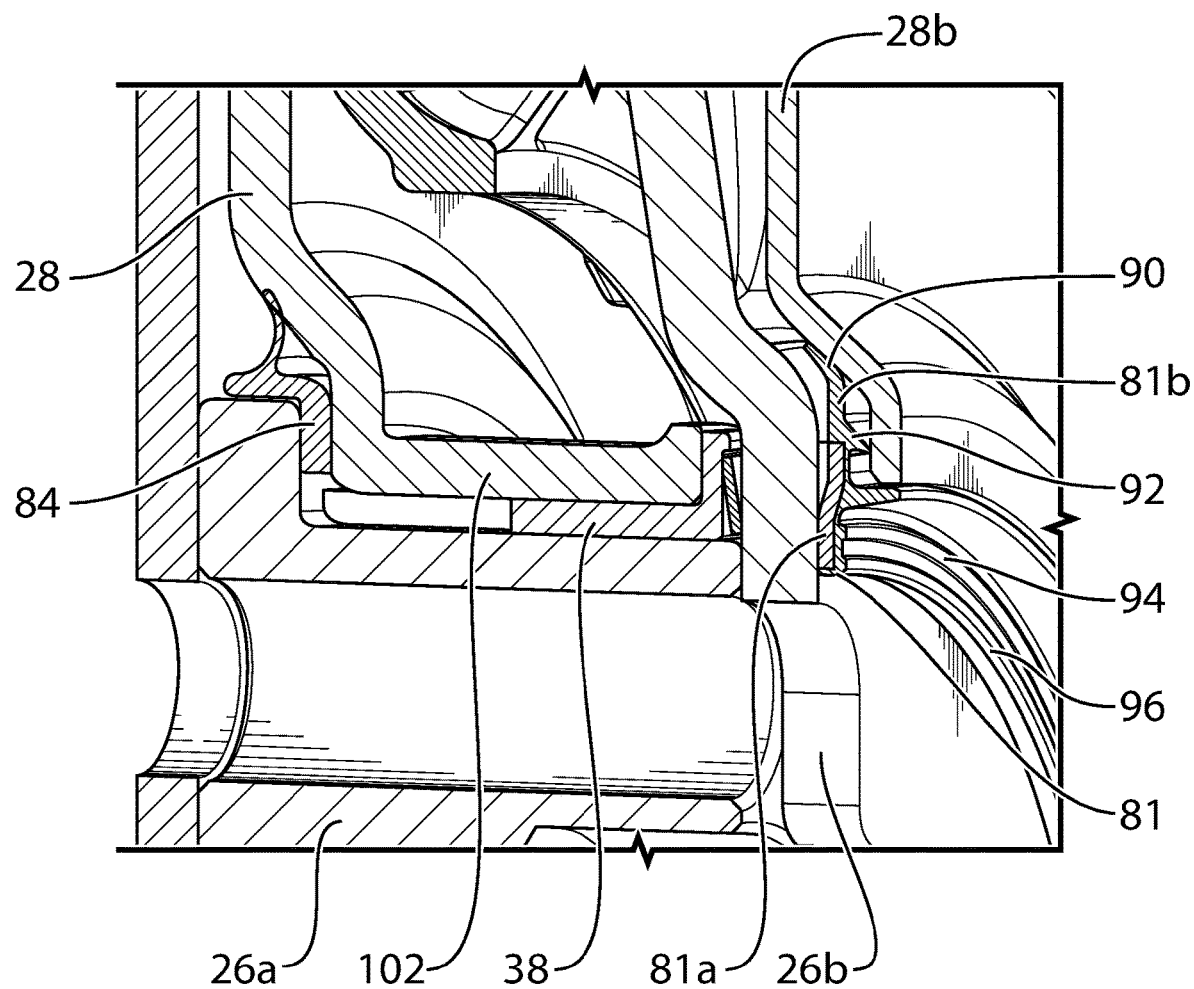
FIG. 9 is another magnified view of the portion of the isolation device shown in FIG. 7.
Figure 10:
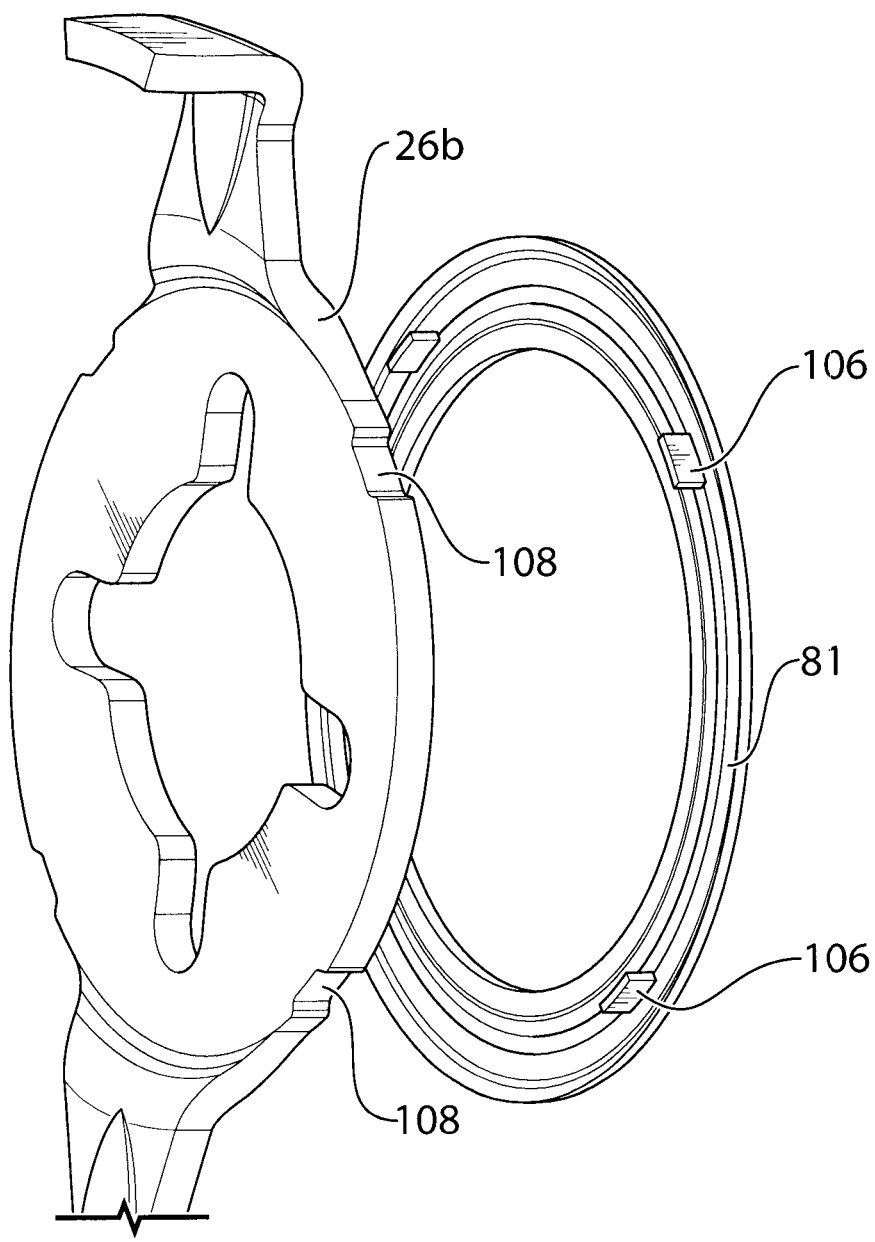
FIG. 10 is an exploded perspective view of some components shown in FIG. 7.
Figure 11:
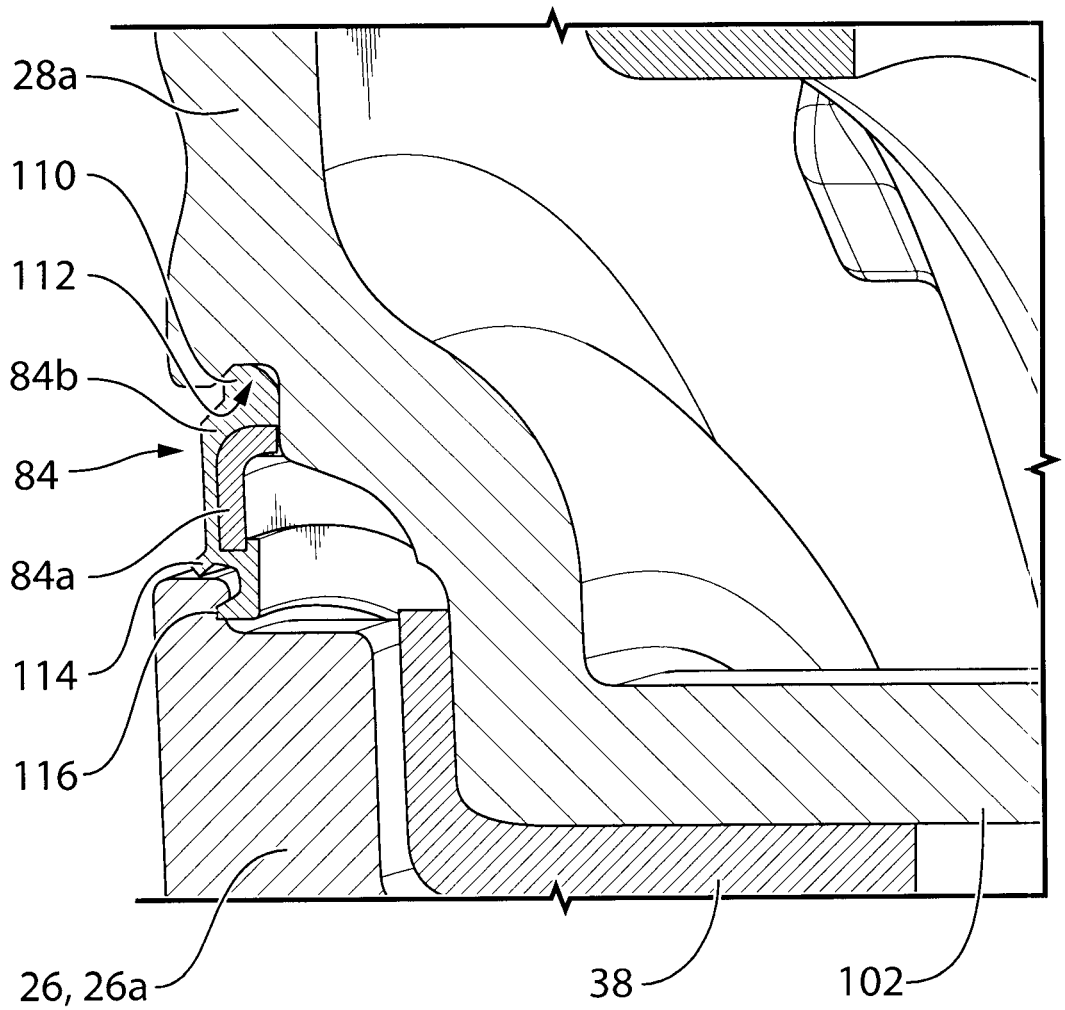
FIG. 11 is another magnified view of the portion of the isolation device shown in FIG. 7.
Figure 12:
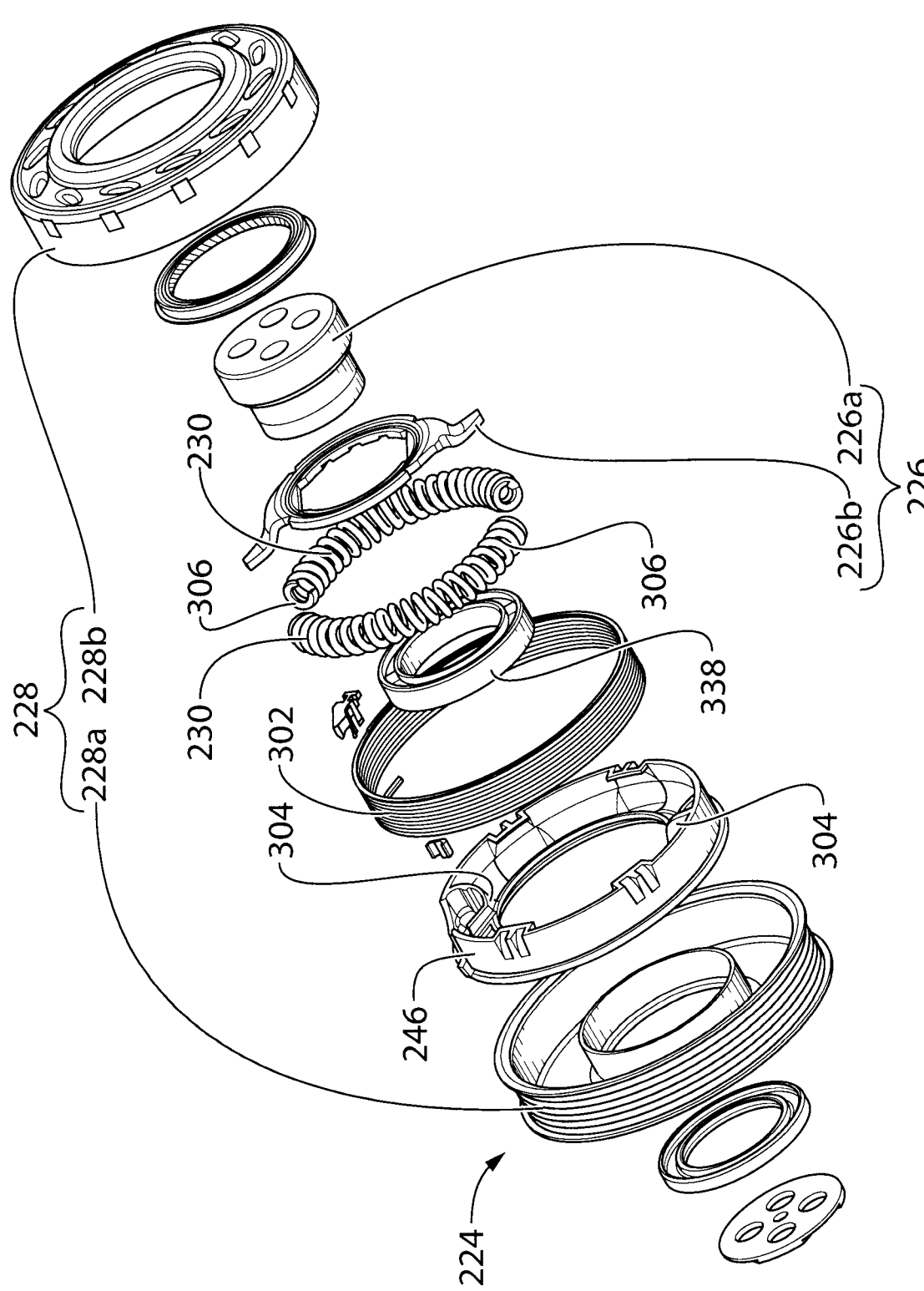
FIG. 12 is an exploded perspective view of an isolation device in accordance with another embodiment of the present disclosure.

Reference is made to FIG. 7, which shows some optional features for the isolation device 24. The isolation device 24 may include a first seal 81 proximate a distal end 82 of the hub 26, between the hub 26 and the pulley 28; and a second seal 84 proximate a proximal end 86 of the hub 26, between the hub 26 and the pulley 28.

The first seal 81 may include a metallic core 81a, and an overmolded flex member 81b, and may include a first pulley engagement lip 90, a second pulley engagement lip 92, and first and second hub engagement ribs 94 and 96. The seal 81 further includes a dust lip 98. Rotation of the isolation device 24 urges the lips 90 and 92 into increased contact centrifugally with the pulley cover 28b. Furthermore, a Belleville washer 100 is provided between the driver 26b and the bushing 38 to urge the bushing, the pulley inner wall shown at 102 and the second seal 84 against a reference surface, which is shoulder 104 on the shaft adaptor 26a. The first and second ribs are compressed for good sealing during installation of the hub 26 on the crankshaft 20.

Optionally, to prevent rotation of the seal 81 during use due to relative movement between the pulley 28 and the hub 26, one or more axial seal projections 106 may be provided that engage mating slots 108 in the driver 26b.

The second seal 84 may include a core member 84a and a flexible member 84b. The second seal 84 may include a first lip 110 that engages a radially extending groove 112 in the pulley 26, and may further include first and second hub engagement lips 114 and 116 that engage the hub 26.

The isolation device 24 as shown in FIGS. 2a and 2b is an isolator, which lacks a one way clutch to decouple the hub 26 and the pulley 28 when desired. Alternatively, however, an isolation device may be provided that also includes decoupling capability. An example of such an isolation device is shown at 224 in FIGS. 12-19. The isolation device 224 may be referred to as a decoupler, as it includes a one-way clutch 302 that permits overrunning of the pulley shown at 228 (which includes a first or main pulley portion 228a and a pulley cover 228b) relative to the hub shown at 226 (which includes a shaft adapter 226a and a driver 226b, in addition to providing isolation via the isolation springs 230. The components of the isolation device 224 which are numbered similarly to their counterpart components from the isolation device 24 may be considered to be similar to those counterpart components.

The operation of the hub 226, the pulley 228, the isolation springs 230 and the wrap spring clutch 302 may be similar to their analogous components in the PCT publication WO2013033825A1, the contents of which are incorporated fully herein by reference.

The decoupler 224 includes a spring shell 246 that may be similar to the spring shell 46, but may be configured to hold the wrap spring clutch 302 on its outer face instead of providing vanes for viscous damping. The spring shell 46 may transfer torque between the isolation springs 230 and the wrap spring clutch 302 and may thus be referred to as a carrier, whose operation in this regard will be understood by one skilled in the art. The carrier 246 has an isolation spring force transfer surface 304 positioned to engage an end 306 of the isolation spring 230. In this example, there are two surfaces 304 for the two spring ends 306. The carrier 246 may further include a carrier body 308 that is polymeric (e.g. Nylon) and that contains a clutch end slot 310 (FIG. 16) in which the first helical end shown at 312 of the wrap spring clutch 302 is positioned. A metallic force spreader 314 is positioned in a force spreader slot 315 in the carrier body 308, in abutment with a tip of the first helical end 310 of the wrap spring clutch 302. The force spreader 314 is also in abutment with a force transmission wall 316 on the carrier body 308. By spreading the force over a relatively larger surface area than is provided on the tip of the helical end 312, the force spreader ensures that goring of the wall 316 does not occur and that the polymeric carrier body 308 is not overly stressed locally during torque transfer.

A clutch retainer 320 is provided and has a clutch retainer body 322 that overlies the first helical end 310 of the wrap spring clutch 302 to prevent removal of the first helical end 310 from the clutch end slot 310, and a plurality of legs 324 that extend through a plurality of corresponding apertures 326 (FIG. 15a) in the carrier body 308 and are bent (FIG. 15b) to lock the clutch retainer 320 to the carrier body 308, thereby preventing withdrawal of the helical end 312 of the wrap spring clutch 302 from the slot 310.

Figure 17:
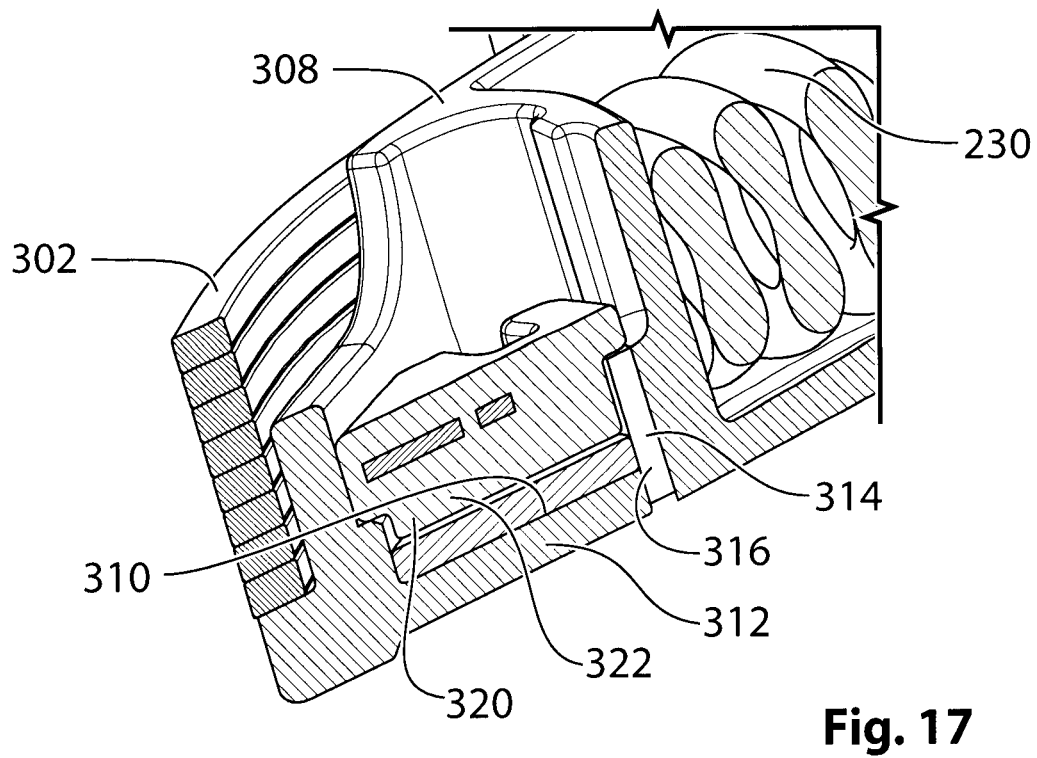
FIG. 17 is a sectional perspective view showing other structure that makes up the aspect identified in FIG. 16.

Optionally, the clutch retainer body 322 is polymeric and is overmolded on a clutch retainer core 323 that is metallic and which includes the clutch retainer legs 324 which project from the clutch retainer body 322. As can be seen in FIG. 17, the clutch retainer body 322 may overly the metallic force spreader 314 in a metallic force spreader slot in the carrier body.

Figure 13:
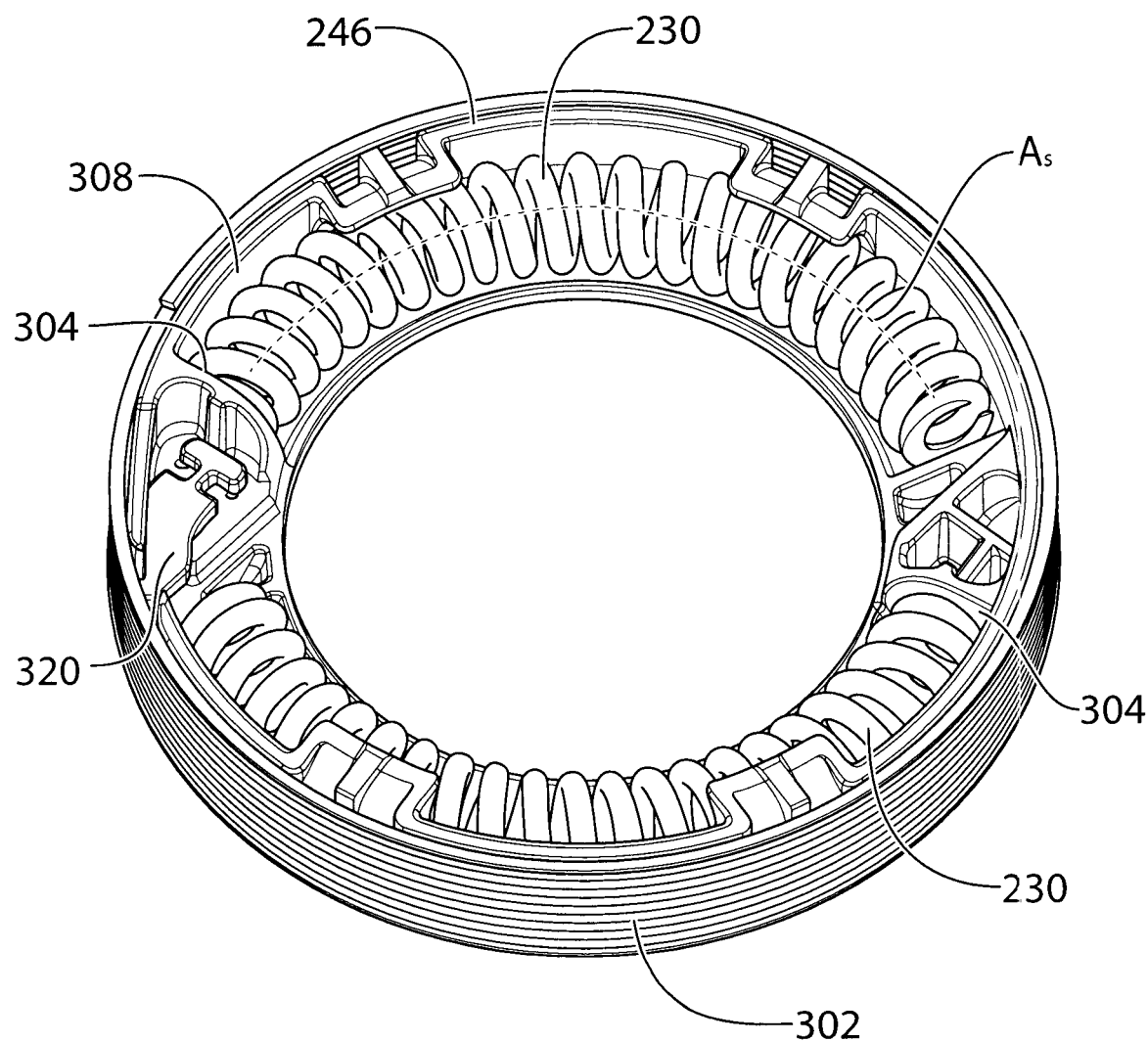
FIG. 13 is a perspective view of a portion of the isolation device shown in FIG. 12.
Figure 14A:
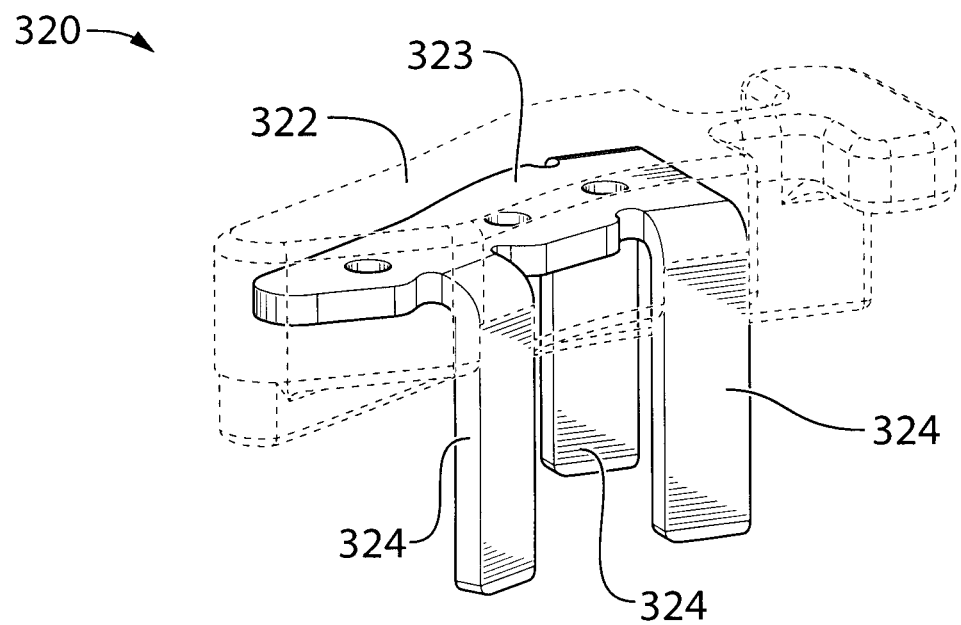
FIGS. 14a and 14b are transparent and non-transparent views of a component that is part of the isolation device shown in FIG. 12.
Figure 14B:
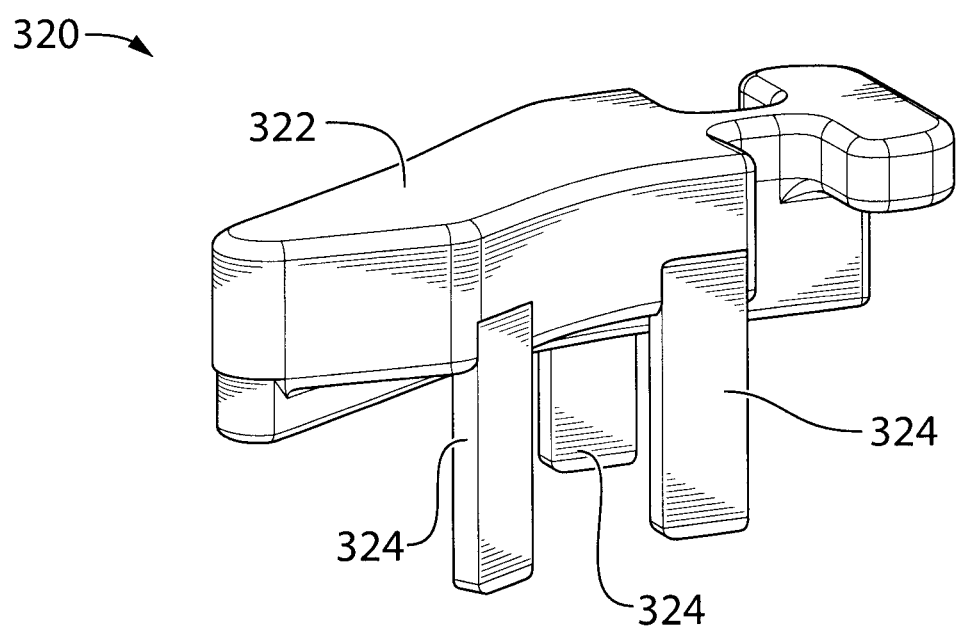
Figure 15A:
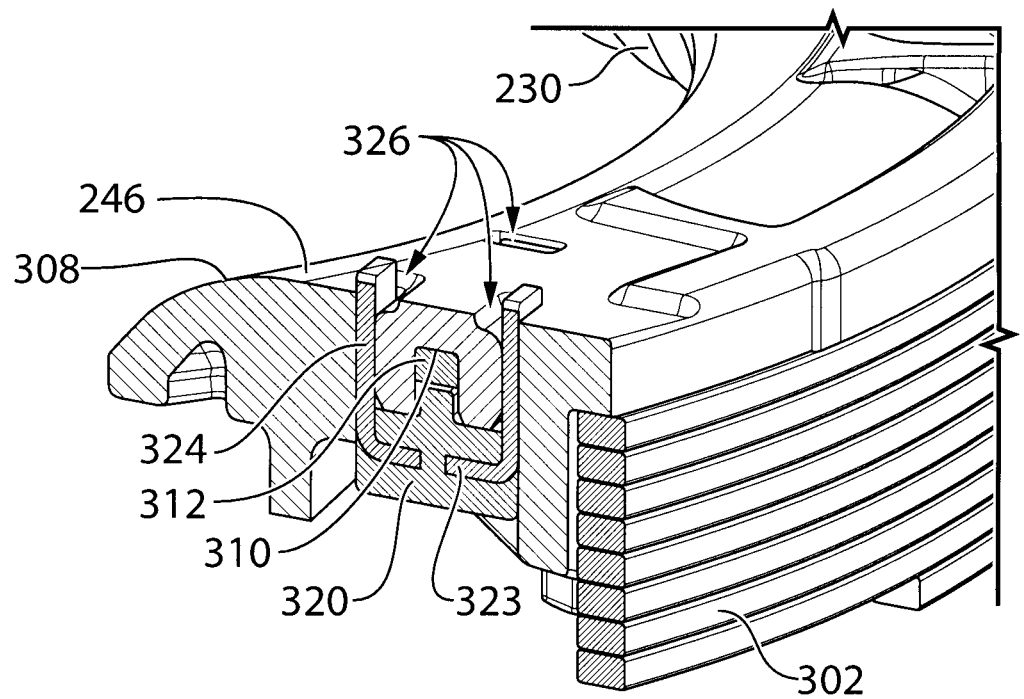
FIGS. 15a and 15b are sectional perspective views of the isolation device showing the component shown in FIGS. 14a and 14b.
Figure 15B:
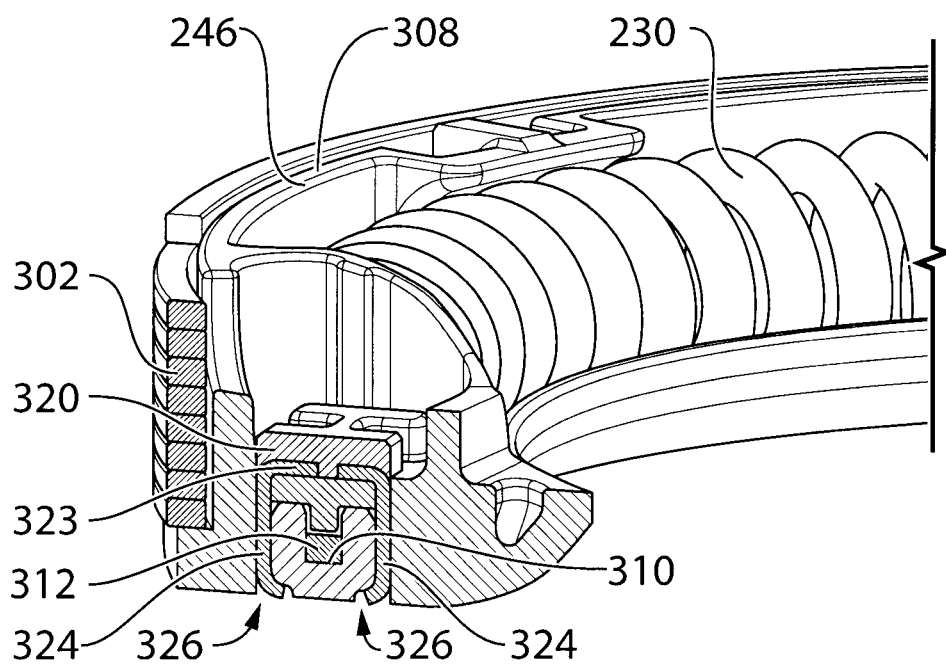
Figure 16:
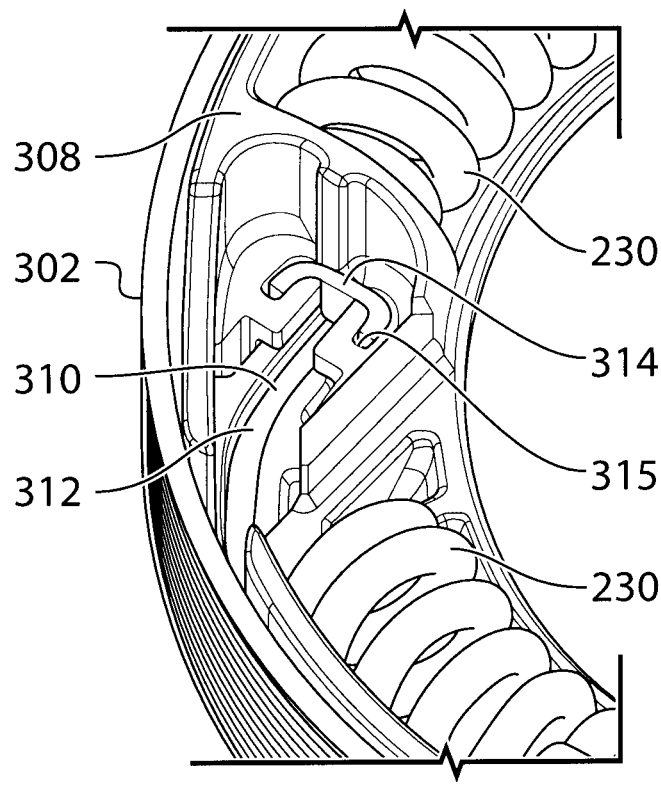
FIG. 16 is another perspective view of a portion of the isolation device shown in FIG. 12, illustrating another aspect of the isolation device.

As can be seen in FIG. 13, the spring shell 246 may, like the spring shell 46 surround more than 180 degrees of the at least one isolation spring 230 in a plane that is perpendicular to the isolation spring axis.

Figure 18:
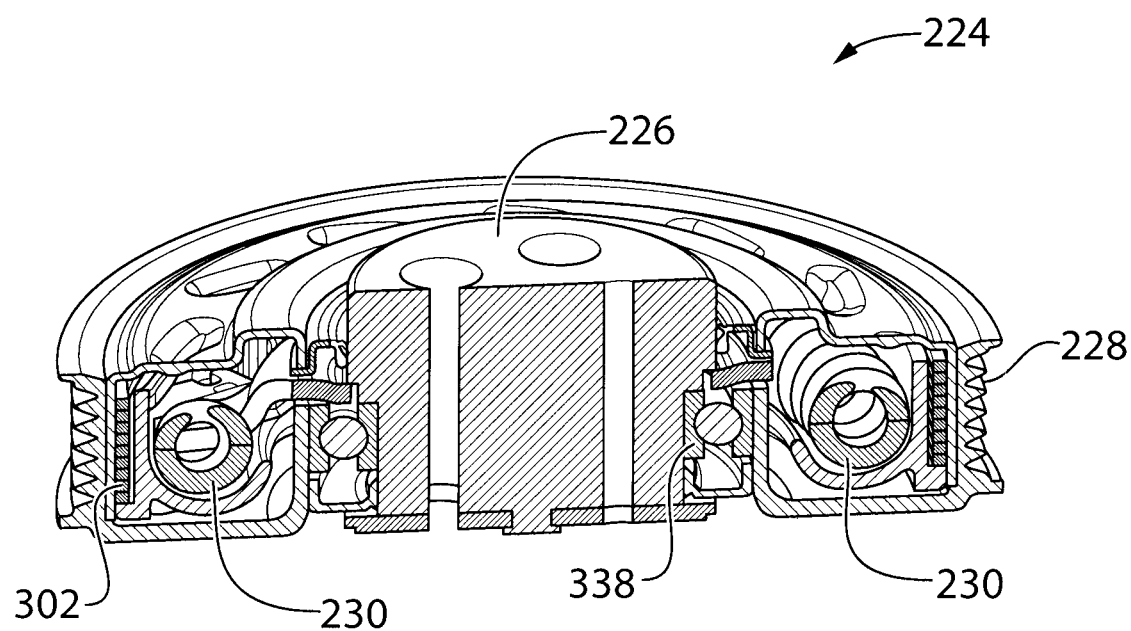
FIGS. 18 and 19 are sectional perspective views showing embodiments of the device shown in FIG. 12, having a ball bearing and a bushing respectively.
Figure 19:
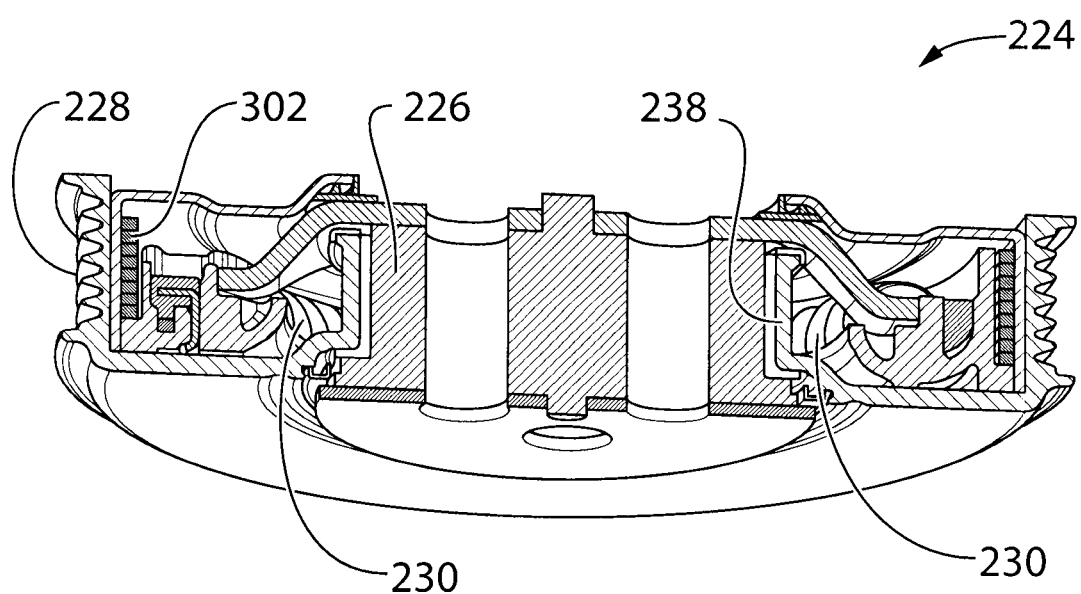

As shown in FIG. 18, the decoupler 224 may employ a ball bearing 338 as the bearing member between the hub 226 and the pulley 228. Alternatively, the decoupler 224 may employ a bushing 238 as shown in FIG. 19 between the hub 226 and the pulley 228.

While the isolation devices 24 and 224 may be provided on the crankshaft of an engine, they may alternatively be provided on a shaft of any other suitable device, such as an alternator or a motor-generator unit.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. An isolation device for engagement between a shaft of a rotating member and an endless drive member, comprising:
   a hub that is mountable to the shaft of the rotating member;
   a pulley that is configured to engage the endless drive member;
   at least one isolation spring that transfers torque between the hub and the pulley; and
   a damping member that cooperates with the pulley to define a fluid chamber having an outlet, wherein the damping member has at least one damping member projection and the pulley has at least one pulley projection thereon, wherein the at least one damping member projection cooperates with the at least one pulley projection to at least in part determine a size of a flow restriction to fluid flow from the fluid chamber, and determine a size of the fluid chamber,
   wherein movement of the pulley and hub relative to one another in at least one direction causes movement of the at least one damping member projection and the at least one pulley projection towards each other so as to reduce the size of the flow restriction, and also reduces the size of the fluid chamber so as to cause fluid to flow through the flow restriction and out of the fluid chamber.

2. An isolation device as claimed in claim 1, wherein the at least one isolation spring is at least one helical compression spring and wherein the damping member is a spring shell that at least partially defines a chamber for the at least one isolation spring.

3. An isolation device as claimed in claim 1, wherein the at least one damping member projection is angled non-radially.

4. An isolation device as claimed in claim 1, wherein the at least one pulley projection extends axially from a surface of the pulley.

5. An isolation device as claimed in claim 1, wherein the isolation device is a decoupler.

6. An isolation device, comprising:
a hub that is connectable to a shaft;
a pulley that is rotatable relative to the hub;
at least one isolation spring positioned to transfer torque between the hub and the pulley, wherein each of the at least one isolation spring is an arcuate helical compression spring having an isolation spring axis that is arcuate; and
a spring shell that is monolithic and that receives the at least one isolation spring and transfers torque between the at least one isolation spring and the pulley, wherein the spring shell surrounds more than 180 degrees of the at least one isolation spring and extends in a plane that is perpendicular to the isolation spring axis, and the spring shell has a first circumferential end defined by at least one projection on a first side of the spring shell and a second circumferential end on a second side of the spring shell, wherein the at least one projection extends farther circumferentially than a portion of the spring shell adjacent to the at least one projection, such that the first and second circumferential ends define an aperture in the plane that is smaller than a diameter of the at least one isolation spring.

7. An isolation device as claimed in claim 6, further comprising:
a one-way clutch that is in series with the at least one isolation spring and the spring shell, wherein, the one-way clutch operatively connects the hub and the pulley to one another when the hub rotates faster than the pulley in a first rotational direction, and substantially operatively disconnects the hub and the pulley from one another when the pulley rotates faster than the hub in the first rotational direction.

8. An isolation device as claimed in claim 7, wherein the one-way clutch is a wrap spring clutch having a first helical end, a second helical end and a plurality of coils between the first and second helical ends.

9. An isolation device as claimed in claim 8, wherein the first helical end of the wrap spring clutch extends into a spring slot in the spring shell and has a tip that engages a force spreader that transfers force between the tip and the spring shell, and wherein a radially outer surface of the coils of the wrap spring clutch are engageable with the pulley to operatively connect the pulley and the spring shell.

10. An isolation device as claimed in claim 9, further comprising a clutch retainer is received in the spring slot and includes a plurality of metal tabs that are bent to retain clutch retainer in position to prevent axial removal of the first helical end of the wrap spring clutch from the spring slot.

11. An isolation device as claimed in claim 6, wherein the spring shell forms a complete ring about a spring shell axis.

\* \* \* \* \*